United States Patent [19]

Nonaka

[11] Patent Number: 4,505,599
[45] Date of Patent: Mar. 19, 1985

[54] ELECTRONIC CLINICAL THERMOMETER

[75] Inventor: Kei Nonaka, Tokyo, Japan

[73] Assignee: Kabushiki Kaisha Daini Seikosha, Tokyo, Japan

[21] Appl. No.: 492,419

[22] Filed: May 6, 1983

[51] Int. Cl.³ .............................................. G01K 7/32
[52] U.S. Cl. ..................................... 374/163; 331/46; 374/170; 377/25
[58] Field of Search ............................... 374/110–117, 374/163, 166, 170, 178, 183; 331/46, 47, 66, 176; 324/78 D, 79 D; 377/25

[56] References Cited

U.S. PATENT DOCUMENTS

| | | | |
|---|---|---|---|
| 3,879,992 | 4/1975 | Bartera | 374/170 |
| 4,150,573 | 4/1979 | Iinuma et al. | 331/66 |
| 4,325,036 | 4/1982 | Kuwabara | 331/176 |
| 4,371,271 | 2/1983 | Bellet | 331/66 |

Primary Examiner—Charles Frankfort
Assistant Examiner—W. Morris Worth
Attorney, Agent, or Firm—Robert E. Burns; Emmanuel J. Lobato; Bruce L. Adams

[57] ABSTRACT

An electronic clinical thermometer comprises oscillating circuitry for producing two oscillating output signals having respective frequency-temperature coefficients which are widely different from each other. A frequency dividing circuit frequency divides one of the two output signals to produce a gate timing signal which controls the gating of the other oscillating output signal to an up/down counter. A switch coacts with the frequency dividing circuit to enable selective changing of the frequency dividing ratio, and another switch coacts with the up/down counter to enable variable setting of the reference count value from which the counter begins to up-count the oscillating output signal to produce an output counter number indicative of the measured temperature. A display device is connected through a decoder driver circuit and a latch circuit to the up/down counter and displays indicia representative of the measured temperature.

8 Claims, 3 Drawing Figures

ELECTRONIC CLINICAL THERMOMETER

BACKGROUND OF THE INVENTION

The present invention relates to an electronic clinical thermometer of the type in which the temperature is measured by comparing two oscillating output signals whose temperature coefficients are extremely different from each other and in which the sensitivity of the temperature measuring is adjustable.

Recently, advances made in the field of electronics have been applied to the art of clinical thermometers.

A method for measuring temperature by comparing two oscillating output signals whose temperatures coefficients are widely different from each other has heretofore been proposed. However, since the relative temperature value varies when the frequency of the oscillating signal having the smaller temperature coefficient is changed, it is necessary to provide means for adjusting the oscillating frequency. Furthermore, since the relative temperature value also varies when the frequency or the frequency-temperature coefficient of the oscillating signal having the large frequency-temperature coefficient is changed, the setting of the frequency-temperature coefficients must be carefully made and provision must be made for adjustment of the frequency.

In the case where two oscillator are provided, although the adjusting cost will be increased, the adjustment of the frequency and the selection of the temperature coefficients can be realized by separately effecting the adjustment of each oscillator. However, in the case of the dual mode oscillating circuit having a quartz vibrator which oscillates in two oscillating modes whose frequency-temperature coefficients are extremely different, since there is only one oscillating circuit, in order to adjust the two oscillating frequencies at the same time, much cost is required to manufacture the suitable quartz vibrator and it is difficult to mass produce such an electronic clinical thermometer.

The present invention is intended to overcome the drawbacks of the conventional device and an object of the present invention is to provide an electronic clinical thermometer in which the relative value of the measured value of the electronic clinical thermometer is adjustable by the adjustment of the gate time obtained by frequency dividing one oscillating output signal.

The present invention will be described in more detail in conjunction with the attached drawings.

Figure 1:
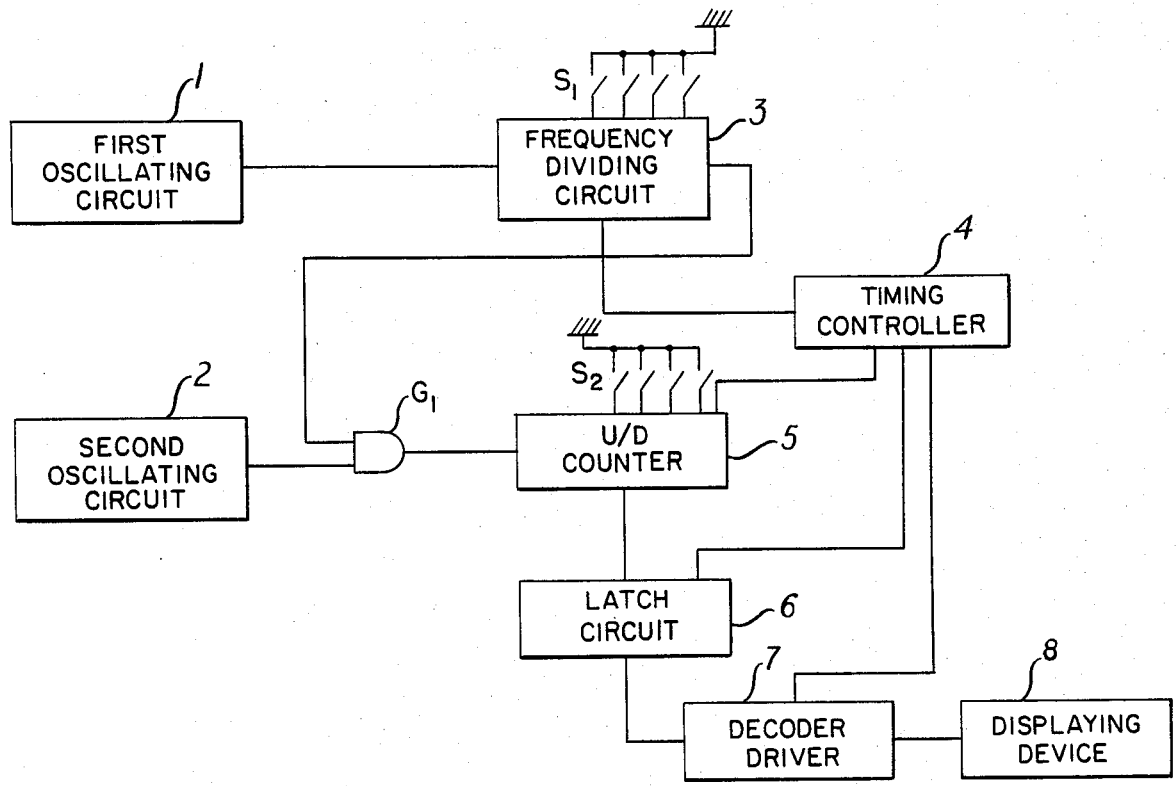
FIGS. 1 and 2 are block diagrams showing two embodiments of the present invention and FIG. 3 shows the waveform of an oscillating output signal of FIG. 2.

FIG. 1 shows an embodiment of the present invention, in which the output signal of a first oscillating circuit 1 is applied to a frequency dividing circuit 3 and the output signal of the frequency dividing circuit 3 is applied to one input terminal of an AND circuit $G_1$. The input signal applied to the AND circuit $G_1$ from the circuit 3 is a signal for determining a gate time by which the output signal of a second oscillating circuit 2 is derived from the AND circuit $G_1$ for a predetermined period of time. The output signal from the AND circuit $G_1$ is applied to an up/down U/D counter 5 and the output signal from the U/D counter 5 is applied to a latch circuit 6 at a proper time by means of a timing controller 4.

The output signal of the latch circuit 6 is applied to a decoder driver 7 and the measured temperature is indicated by a displaying device 8. The frequency dividing ratio of the frequency dividing circuit 3 is changeable by the operation of a switch $S_1$ to thereby control the output signal of the frequency dividing circuit 3 which is an input signal applied to one input terminal of the AND circuit $G_1$. A switch $S_2$ is used for setting the down value of the U/D counter and the absolute value of the temperature is adjustable by means of the switch $S_2$. The initial setting operation of the U/D counter 5 is possible by the use of the timing controller 4 before carring out the detection of the temperature.

Assuming that, at a predetermined reference temperature value, the oscillating frequency of the first oscillating circuit 1 is $f_1$, the frequency-temperature coefficient thereof is $\Delta f_1(t)$, the oscillating frequency of the second oscillating circuit 2 is $f_2$, the frequency-temperature coefficient thereof is $\Delta f_2(t)$, and $\Delta f_1(t) >> \Delta f_2(t)$. Furthermore, the gate time for the AND circuit $G_1$ which is determined by dividing the frequency of the output signal of the first oscillating circuit 1 by means of the frequency dividing ciucuit 3, is $T_1$.

Thus, the relationship between the oscillating frequency $f_1$ and the gate time $T_1$ at the reference temperature value and the relationship between the counted number $K_1$ and the gate time $T_1$ can be expressed as follows:

$$T_1 = N/f_1 \tag{1}$$

N: reciprocal number of the ratio of the frequency dividing $$K_1 = T_1 \times f_2 \tag{2}$$

When the temperature changes by t, the gate time and the counted number will be expressed as follows:

$$T_1(t) = \frac{N}{f_1 + \Delta f_1(t) \times t} \tag{3}$$

$$K_1(t) = T_1(t) \times \{f_2 + \Delta f_2(t) \times t\} \tag{4}$$

Assuming that $\Delta f_1(t) >> \Delta f_2(t)$ and $\Delta f_2(t)$ is negligible for the temperature measurement, the equation (4) can be written as $$K_1(t) = T_1(t) \times f_2 \tag{5}$$

Consequently, in the case that only the temperature changes, the changes K(t) in the counted number can be expressed as $$K(t) = K_1(t) - K_1 = f_2 \cdot (T_1(t) - T_1) \tag{6}$$

Usually, the temperature is measured by considering the changes of the counted number K(t) due to the temperature t in view of the temperature change. As will be seen from the equation (6), the amount of the change in the counted number depends upon the oscillating frequency $f_1$, the temperature coefficient $\Delta f_1(t)$, the oscillating frequency $f_2$ and the reciprocal number of the ratio of the frequency dividing.

In general, the oscillating frequencies $f_1$ and $f_2$ and the temperature coefficient $\Delta f_1(t)$ are not uniform, but these values vary or fluctuate due to manufacturing tolerances.

The adjustment of the oscillating frequencies $f_1$ and $f_2$ can be made by the use of a trimmer condenser, but the temperature coefficient $\Delta f_1(t)$ cannot be adjusted in this manner. Since the temperature coefficient of the oscillating frequency $f_1$ is extremely large, in the manufacturing process, the variation of this value is liable to become large as compared to the value of the temperature coefficient of the small temperature coefficient oscillator. Consequently, sometimes the adjustment becomes impossible so that the manufacturing cost is increased or the mass production becomes impossible.

According to the present invention, it is not required to adjust the oscillating frequencies $f_1$ and $f_2$, and the variation of the temperature coefficient $\Delta f_1(t)$ can be effectively compensated. Further, by the adjustment of the reciprocal number N of the ratio of the frequency dividing in the frequency dividing circuit 3, the gate time $T_1$ and $T_1(t)$ are adjusted, and the counted number $K(t)$ corresponding to the temperature change t can be adjusted.

Therefore, when a temperature change of 7.07° C. is detected because a 1% error is produced in the oscillating frequencies $f_1$ and $f_2$ and the temperature coefficient $\Delta f_1(t)$ for an actual temperature change of 7° C. between 35° C. and 42° C., in order to cancel or compensate the change, the reciprocal number N of the ratio of the frequency dividing should be reduced in such a way that the output signal of the frequency dividing circuit 3, which is an input signal to one input terminal of the AND circuit $G_1$, is shortened by 1%, i.e., the gate time is shortened by 1%.

In this case, the error occurs in the absolute value of the measured temperature. In the embodiment shown in FIG. 1, the absolute value can be adjusted by means of the U/D counter 5 having the switch $S_2$. The U/D counter 5 operates as a down-counter until the counted result reaches a predetermined value determined by the switch $S_2$, and then it operates as an up-counter. Consequently, when the measured temperature has an error of 2° C. relative to the absolute value the counter 5 counts down by the counted number corresponding to 2° C. to compensate for any difference between the measured value and the absolute or actual value.

According to the present invention, since the temperature is adjustable in a digital manner without the measurement of the frequency of the oscillating circuit, it is advantageous that the variation of the frequency of the quartz vibrator with extremely large frequency-temperature coefficient can be easily compensated especially for an electronic clinical thermometer having a quartz oscillating circuit in which a quartz vibrator with an extremely large frequency-temperature coefficient is used as the oscillating source.

Figure 2:
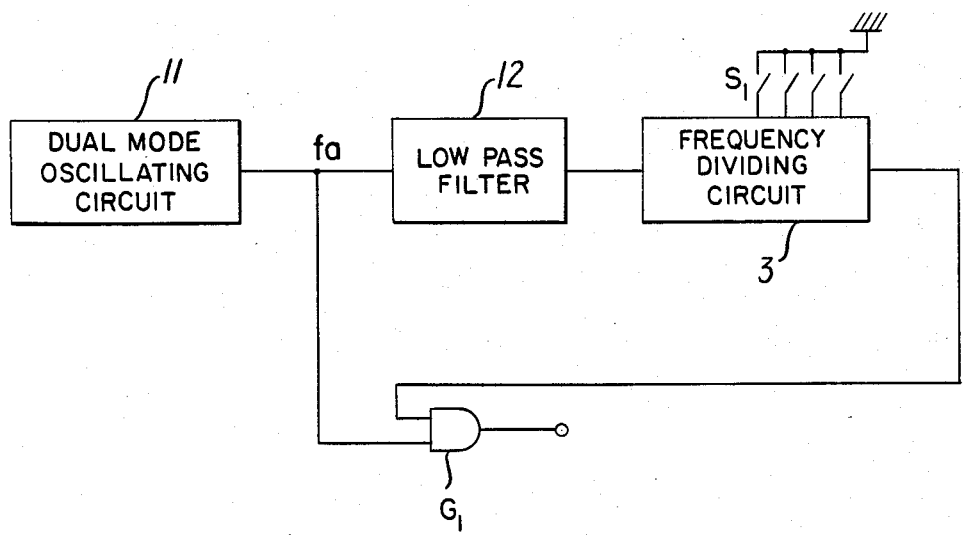
Figure 3:
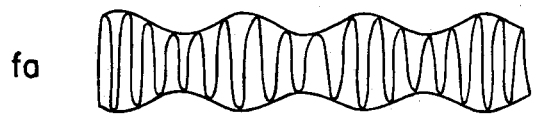

FIG. 2 shows another embodiment of the present invention. A dual mode oscillating circuit 11 has a quartz vibrator with two vibrating modes as an oscillating source and the oscillating output signal $f_a$ of the dual mode oscillating circuit 11 is illustrated in FIG. 3. The output signal of the dual mode oscillating circuit 11 is applied to a low pass filter 12 and an AND circuit $G_1$. The output signal of the low pass filter 12 is applied to the frequency dividing circuit 3. Since the operating principle of the embodiment of FIG. 2 is essentially the same as that of the embodiment of FIG. 1 except that only one oscillating circuit is provided, the description thereof will be omitted.

Since the dual mode oscillating circuit 11 has only one vibrator, it is difficult to separately adjust the two oscillating frequencies. Therefore, the method according to the present invention in which the ratio of the frequency dividing of the frequency dividing circuit 3 is properly adjusted is especially effective.

In the FIG. 2 embodiment, although the oscillating output signal is directly applied to one input terminal of the AND circuit $G_1$, the signal obtained by dividing the frequency of the oscillating signal may be applied to the AND circuit $G_1$. The remainder of the FIG. 2 circuit is like that shown in FIG. 1.

As described above, according to the present invention, since the adjustment of the oscillating circuit is not needed and the variations of the oscillating frequency and the temperature coefficient of the oscillating circuit are easily adjustable, the manufacturing cost of the parts can be reduced so that it is effective for mass production of the electronic clinical thermometer.

I laim:

1. An electronic clinical thermometer comprising in combination: a first oscillating circuit having a first temperature coefficient and operable to produce a first oscillating output signal; a frequency dividing circuit connected to said first oscillating circuit and having a selectively changeable frequency dividing ratio for adjustably frequency dividing the first oscillating output signal; switching means connected to said frequency dividing circuit for selectively changing the dividing frequency thereof; a second oscillating circuit having a second temperature coefficient which differs widely from said first temperature coefficient and operable to produce a second oscillating output signal; an AND gate connected to receive the first and second output signals from said first and second oscillating circuits; a timing controller connected to said frequency dividing circuit; an up/down counter connected to said AND circuit and said timing controller and having a selectively changeable counting frequency; another switching means connected to said up/down counter for selectively changing the counting frequency thereof; a latch circuit connected to said up/down counter and said timing controller; a decoder driver connected to said latch circuit and said timing controller; and a display device connected to said decoder driver.

2. An electronic clinical thermometer for measuring temperature comprising: oscillating means for producing two oscillating output signals having respective frequency-temperature coefficients which are widely different from each other; frequency dividing means for frequency dividing one of the two output signals to produce a gate timing signal; a gate circuit receptive of the gate timing signal and the other of the two output signals for gating the other output signal in accordance with the gate timing signal; an up/down counter connected to receive the other output signal and up-count the same from a variably settable reference count value and produce an output count number indicative of a measured temperature; switching means coacting with the up/down counter for variably setting the reference count value in the up/down counter to compensate for any difference between the measured temperature and the actual temperature being measured so that the output count number indicates a measured temperature corresponding to the actual temperature; and circuit means receptive of the output count number for displaying the measured temperature.

3. An electronic clinical thermometer according to claim 2; wherein the frequency dividing means has a changeable frequency dividing ratio and includes switch means for selectively changing the frequency dividing ratio to thereby change the gate timing signal.

4. An electronic clinical thermometer according to claim 3; wherein the oscillating means comprises two separate oscillating circuits for producing the two oscillating output signals.

5. An electronic clinical thermometer according to claim 3; wherein the oscillating means comprises a dual mode oscillating circuit operable in two oscillating modes for producing the two oscillating output signals.

6. An electronic clinical thermometer according to claim 2; wherein the oscillating means comprises two separate oscillating circuits for producing the two oscillating output signals.

7. An electronic clinical thermometer according to claim 2; wherein the oscillating means comprises a dual mode oscillating circuit operable in two oscillating modes for producing the two oscillating output signals.

8. An electronic clinical thermometer according to claim 2; wherein the circuit means comprises a latch circuit connected to receive and latch the output count number produced by the up/down counter, a decoder driver circuit connected to the latch circuit, and a display device connected to the decoder driver circuit.

* * * * *